United States Patent [19]

Massey

[11] 4,193,579
[45] Mar. 18, 1980

[54] DETACHABLE HANDLE FOR CONTROL DEVICES

[75] Inventor: Roger G. Massey, Exeter, N.H.

[73] Assignee: Parker & Harper Mfg. Co., Inc., Worcester, Mass.

[21] Appl. No.: 849,678

[22] Filed: Nov. 8, 1977

[51] Int. Cl.² ............................................. F16K 31/60
[52] U.S. Cl. .................................. 251/288; 251/292
[58] Field of Search .............. 251/292, 288; 85/32 R, 85/56; 151/15

[56] References Cited

U.S. PATENT DOCUMENTS

| | | | |
|---|---|---|---|
| 1,990,197 | 2/1935 | Mohr | 251/292 |
| 2,653,835 | 9/1953 | Nelson | 151/15 |
| 2,681,787 | 6/1954 | Dopp et al. | 251/288 |
| 2,981,284 | 4/1961 | Putnam | 251/292 |
| 3,744,752 | 7/1973 | Massey | 251/292 |
| 3,865,130 | 2/1975 | Mullis | 251/292 |
| 3,954,251 | 5/1976 | Callahan, Jr. et al. | 251/288 |
| 3,970,285 | 7/1976 | Lonn | 251/288 |
| 4,016,804 | 4/1977 | Turecek | 251/288 |

Primary Examiner—William R. Cline
Assistant Examiner—H. Jay Spiegel
Attorney, Agent, or Firm—Thomas N. Tarrant

[57] ABSTRACT

A combined stem assembly and removable handle for a rotary control device such as a valve. The handle interlocks with an indexing member and is secured by a hollow nut that screws onto the stem over and enveloping the nut holding the stem assembly together.

3 Claims, 3 Drawing Figures

DETACHABLE HANDLE FOR CONTROL DEVICES

BACKGROUND OF THE INVENTION

1. Field of the Invention

The present invention relates to detachable handles for control devices and particularly to handles for rotary valves which are detachable for safety or to prevent undesired operation.

2. Description of the Prior Art

Detachable handles are fairly common for fluid valves as are valves with stem members designed for operation by wrenches or special tools. The reasons generally relate to security purposes such as where the valve is used to control dangerous fluids or where accidental or careless movement of the valve could upset a critical flow rate. Valves having this feature are usually specially designed for the purpose and have either no handle as such or a special handle that cannot be readily fixed to the valve stem. Many handles can be removed only after removing nuts or bolts. Frequently, and particularly with ball valves, loosening the securing nut loosens the entire stem assembly.

U.S. Pat. No. 3,744,752, assigned to the present assignee, covers a removable handle in which the handle is secured by a spring clip. Since the spring clip is readily removed without tools it does not fill the demand for applications where it is sometimes desired to bolt the handle securely in place.

SUMMARY OF THE INVENTION

Now in accordance with the present invention, a novel arrangement has been found for providing a rotatable control device with a handle that can be utilized either as an affixed handle or a handle that is attached only in the manner of a tool when it is desired to operate the valve. The inventive arrangement uses an indexing member placed over a rotatable control stem such that the two must rotate together. A nut threaded over the control stem secures the indexing member in place. A handle having an aperture cut out to fit the circumference of said indexing member can be secured in place by a second special nut substantially larger than the first nut and having a hollow bottom allowing it to envelop the first nut and secure the handle when it is threaded over the stem.

Thus it is an object of the invention to provide a novel detachable handle for a rotatable control device.

Further objects and features of the invention will become apparent upon reading the following description together with the drawing.

DESCRIPTION OF THE PREFERRED EMBODIMENT

In the preferred embodiment, a detachable handle is implemented at no substantial cost difference from a permanent handle and can be used either as a permanent or a detachable handle.

Figure 1:
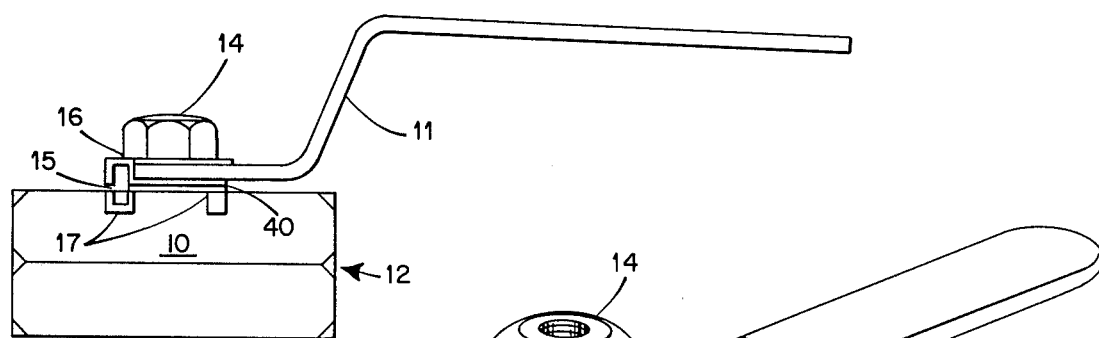
FIG. 1 is a side elevation of a valve according to the invention.

In FIG. 1, body 10 is the body of a valve. While the invention is not limited to ball valves, the illustrations were made from an actual ball valve assembly. Handle 11 is depicted as a stamped metal handle that is secured to operate valve 12 between open and closed operating conditions. Nut 14 secures handle 11 in place. Dog 15 of indexing member 16 engages indexing stops 17 on valve body 10. Stops 17 allow 90 degree rotation of handle 11 between full open and full closed positions.

Figure 2:
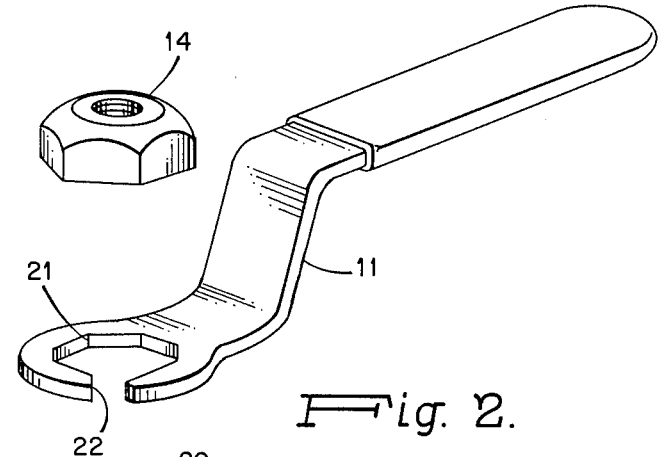
FIG. 2 is an isometric view of the valve of FIG. 1 partially exploded.
Figure 3:
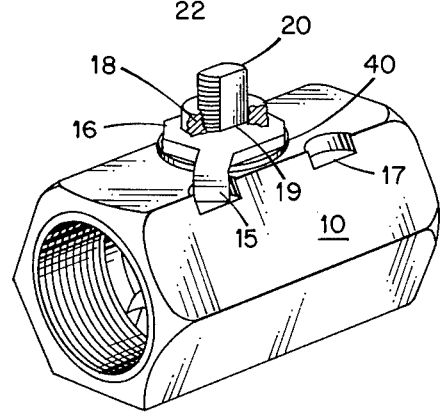
FIG. 3 is a cross-section through 3—3 of the valve of FIG. 1.
Figure 3:
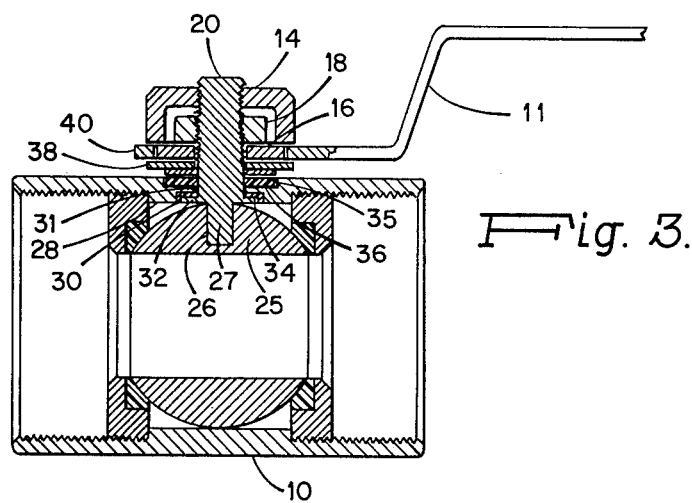

Handle 11 and nut 14 are removed in FIG. 2 showing indexing member 16 in the form of a shaped washer with a depending tab as dog 15. Member 16 is held securely in place by nut 18 threaded over stem 20. Nut 18 also secures the entire stem assembly together and to valve body 10 as can be seen in FIG. 3. Stem 20 is flat sided as shown and member 16 is apertured with straight-sided aperture 19 as depicted by partial section whereby member 16 must rotate with stem 20.

Handle 11 has an aperture 21 mating with the exterior shape of member 16. Slot 22 from aperture 21 provides for protrusion of dog 15. With nut 14 removed, handle 11 can be readily attached over indexing member 16 or removed therefrom as a detachable handle.

FIG. 3 is a cross-section showing how the parts assemble together. Body 10 encloses ported ball 25 depicted in the open position with its ports aligned along the valve axis. Slot 26 in the top of ball 25 mates with rib 27 extending from the bottom of stem 20 for rotation of ball 25.

Interior 28 of body 10 carries an annular recess 30 about aperture 31 through which stem 20 extends.

The bottom of stem 20 is curcular flange 32 fitting recess 30. Plastic thrust washer 34 fits on top of flange 32 in recess 30. It will be noted that stem 20 can only be installed from the inside of body 10 and must be secured in place from the outside. The outside of body 10 has an annular recess 35 around aperture 31 for plastic stem seal washer 36. One or more metal washers 38 are positioned over stem 20 on top of washer 36. Larger washer 40 is positioned on top of washer 38 and indexing member 16 is positioned on top of washer 40. Washer 40 is slightly larger than member 16 so as to act as a backstop for handle 11.

Nut 18 is screwed onto stem 20 on top of member 16 tightening the assembly together and assuring a stem seal by compression of washers 34 and 36.

Handle 11 is positioned over indexing member 16 and nut 14 is threaded onto the end of stem 20 securing handle 11. Nut 14 is removed and left off in situations where it is desired to attach and remove the handle each time the valve is operated.

While the invention has been described with respect to a specific embodiment it is readily adaptable to most controls that operate by rotation of less than 360°. Indexing member 16 can take a variety of forms and can be secured in a variety of ways without departing from the spirit of the invention. Accordingly, it is intended to cover the invention as set forth within the scope of the appended claims.

I claim:

1. A valve assembly with a detachable handle comprising:
   (a) A valve body;
   (b) a valve stem that extends inside said valve body and is secured in place by a first nut screwed onto said stem at the exterior of said valve body;
   (c) an indexing member positioned over said stem under said nut, said indexing member having a depending tab mating with indexing stops in said valve body;

(d) a detachable handle mating with the periphery of said indexing member in a single position relative to said indexing member by means of an aperture and a slot extending from said aperture to accomodate said depending tab; and, (e) a second nut with skirts extending past the periphery of said first nut so as to secure said handle in place while enveloping said first nut, whereby said first nut secures said stem and said indexing member in place independently of said handle and said second nut permits said handle to be secured or detached independently of said indexing member.

2. A valve assembly according to claim 1 wherein said valve assembly comprises a ball valve and said indexing stops are two stops defining substantially 90 degree rotation of said valve stem.

3. A valve assembly according to claim 2 further comprising a washer positioned under said indexing member and having a periphery extending beyond said indexing member so as to backstop said handle.

* * * * *